United States Patent [19]
Shively et al.

[11] Patent Number: 5,954,847
[45] Date of Patent: Sep. 21, 1999

[54] RADIAL AIR FILTER

[75] Inventors: Terrence Allen Shively, Gastonia; Willie Luther Stamey, Jr., Kings Mountain, both of N.C.

[73] Assignee: Dana Corporation, Toledo, Ohio

[21] Appl. No.: 09/102,647

[22] Filed: Jun. 23, 1998

[51] Int. Cl.[6] .................................................. B01D 46/00
[52] U.S. Cl. ......................... 55/385.3; 55/497; 55/498; 55/520; 55/521; 123/198 E
[58] Field of Search .................... 55/385.3, 485, 55/497, 498, 520, 521; 123/198 E; 156/86, 203, 210; 210/402, 493.1, 499

[56] References Cited

U.S. PATENT DOCUMENTS

| | | |
|---|---|---|
| 2,654,440 | 10/1953 | Robinson . |
| 2,897,971 | 8/1959 | Gewiss . |
| 3,413,782 | 12/1968 | Bartlett ....................................... 55/485 |
| 3,417,551 | 12/1968 | Bonell ........................................ 55/498 |
| 3,937,663 | 2/1976 | Bessiere . |
| 4,017,401 | 4/1977 | Holz . |
| 4,128,408 | 12/1978 | Poole ........................................ 55/498 |
| 4,594,162 | 6/1986 | Berger . |
| 5,160,519 | 11/1992 | Svensson et al. .......................... 55/498 |
| 5,368,621 | 11/1994 | Pool .......................................... 55/498 |
| 5,413,712 | 5/1995 | Gewiss et al. . |
| 5,472,463 | 12/1995 | Herman et al. .......................... 55/385.3 |

Primary Examiner—Jay H. Woo
Assistant Examiner—Minh-Chau T. Pham
Attorney, Agent, or Firm—Millen, White, Zelano, & Branigan, P.C.

[57] ABSTRACT

A radial air filter is pleated in the horizontal direction rather than the vertical direction so as to have increased capacity and efficiency with reduced air flow restriction. Preferably, the pleats have a parabolic cross section wherein the panels of the pleats form legs of parabolas with the legs being joined by arcuate peaks and valleys.

12 Claims, 2 Drawing Sheets

RADIAL AIR FILTER

FIELD OF THE INVENTION

The present invention is directed to radial air filters, and more particularly, the present invention is directed to radial air filters for filtering inlet air for internal combustion engines.

BACKGROUND OF THE INVENTION

There is a constant need to improve the capacity, efficiency and restriction reduction of air filters used in internal combustion engines in order to enhance efficiency. Radial air filter elements generally comprise an annular filter media which is pleated and has panels which extend axially, so that when the filter is installed in a filter housing for filtering inlet air for internal combustion engines the panels extend vertically and are joined by vertically extending peaks and valleys. With the current arrangement, there is a tendency for particles entrained in the air stream being drawn into the engine to bridge between adjacent the panels and thus cutoff flow of air downstream of the bridge. This reduces the amount of particulate that the filter will hold before being plugged and increases the restriction to air flow since less filter area is exposed to the inlet air stream. Face velocity of the air stream increases which increases impact speed that in turn results in some particles passing completely through the filter media. The increase in restriction due to bridging decreases horsepower and increases fuel consumption. The increased fuel consumption in a vast fleet of cars generates additional air pollution and consumes economical resources which might be otherwise directed.

Reducing restriction is of immediate concern to racing car engines in which immense amounts of air are consumed by an engine over a relatively short period of time. Technology developed for racing car engines is frequently transferable to street vehicles and other machines and therefore has significance far beyond its original use.

In view of these considerations there is a constant need for air filters which have increased capacity and efficiency as well as reduced air flow restriction.

SUMMARY OF THE INVENTION

It is a feature of this invention to provide a new and improved air filter element having increased capacity and efficiency as well as reduced air flow restriction.

In view of these features and other features, the present invention is directed to an air filter comprising a filter media defining a hollow core, wherein the filter media is pleated into panels which meet along lines with defined peaks and valleys. The panels and lines of the filter media extend around the hollow core.

In a further aspect of the invention, the filter media is pleated to define panels which in cross section are substantially legs of parabolas with the panels having curved end portions joining curved end portions of adjacent panels to form arcuate ends. The arcuate ends form peaks and valleys of the pleated media and the peaks and valleys extend around the hollow core.

The air filter of the present invention may have any shape but is preferably round or ellipsoidal.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
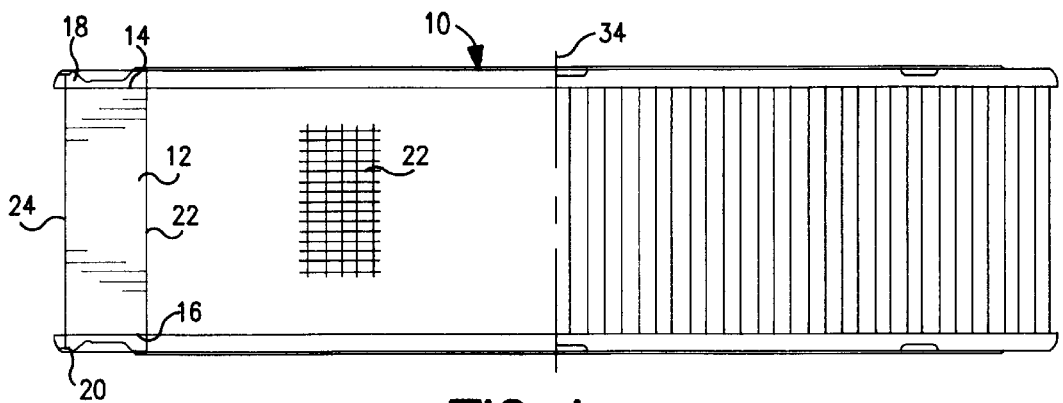
FIG. 1 is a side view of a prior art radial air filter element shown partially in section.
Figure 2:
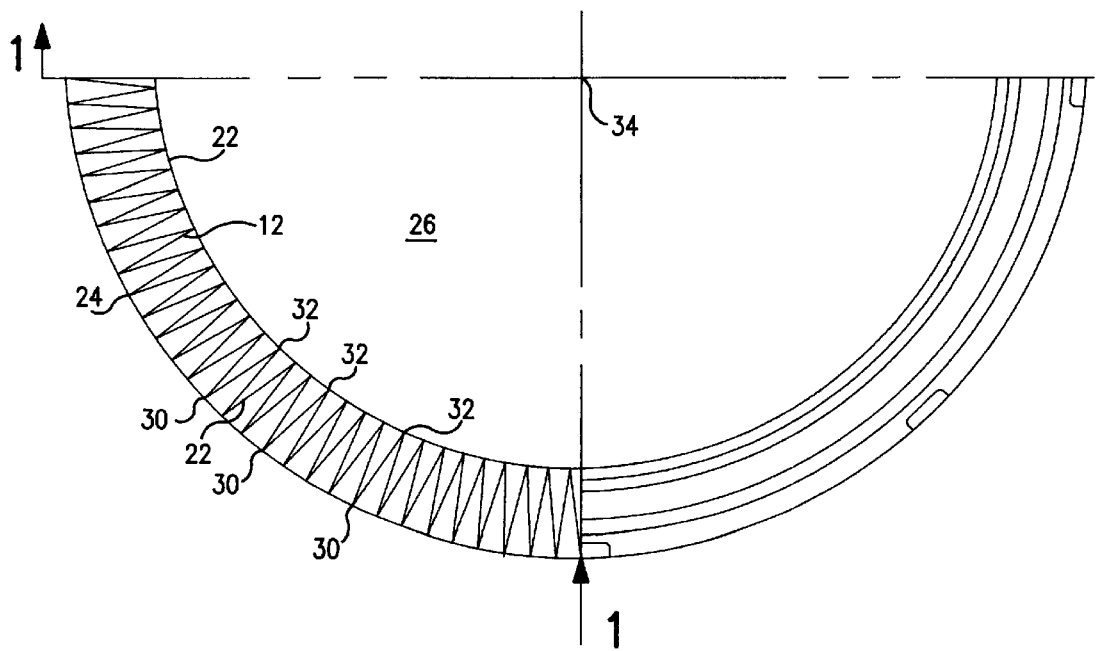
FIG. 2 is a top view of the prior art filter element of FIG. 1, shown partially in section.

Referring now to FIGS. 1 and 2, there is shown a prior art filter element 10 comprising a filter media 12 having an upper end 14 and a lower end 16. The upper end 14 is closed by a rubberized end cap 18 while the bottom end is covered by a rubberized end cap 20. An inner screen 22 provides support for the filter media 12 which keeps the filter media from collapsing inwardly due to pressure on its outer face 24. As is best seen in FIG. 2 the filter media 12 is arranged in an annulus about a hollow core 26. The filter media 12 has panels 28 joined to one another at peaks 30 and valleys 32 which extend vertically or in the same direction as the axis 34 of the filter element 10.

Figure 3:
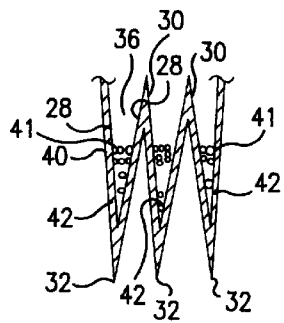
FIG. 3 is a top view of a radial portion of the air filter media used with the prior art filter element in FIGS. 1 and 2.

As is seen in FIG. 3, the gaps 36 between the panels 28 of the prior art filter element tend to fill with particles 40 at locations upstream of the valleys 32 thereby forming bridges 41 which block the air being filtered from passing through portions 42 of the panels 28 downstream of the bridges. Thus, the filter media 22 is underutilized which results in its capacity being lowered, restriction increased and efficiency being lowered.

Figure 4:
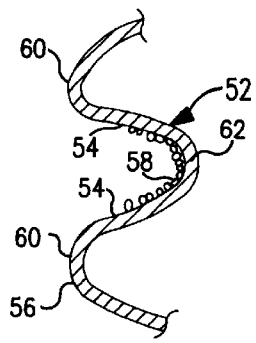
FIG. 4 is a side view of a portion of filter media configured in accordance with the principles of the present invention.
Figure 5:
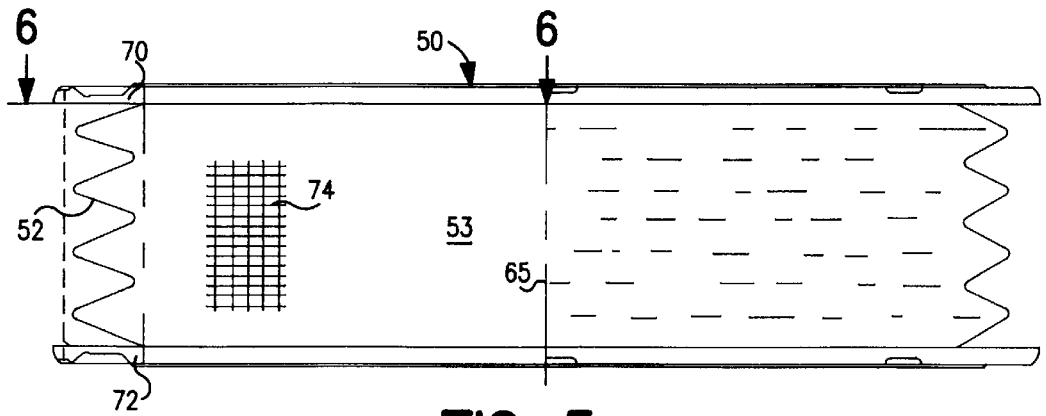
FIG. 5 is a side view, partially in section, of a filter element configured in accordance with the present invention.
Figure 6:
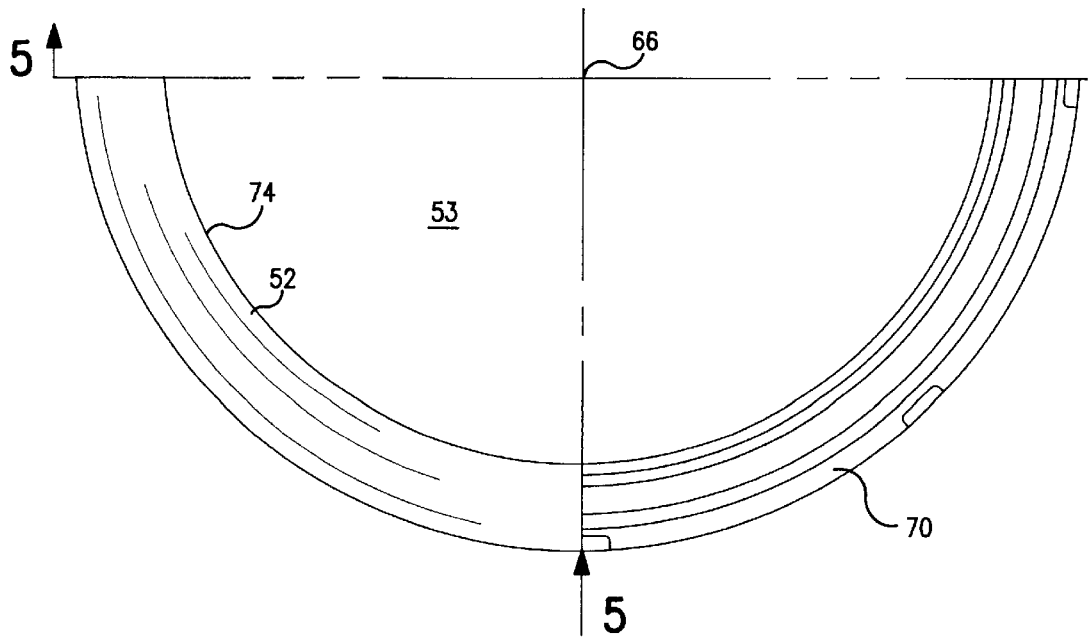
FIG. 6 is a top view, partially in section, of the filter element of FIG. 5.

Referring now to FIGS. 4, 5 and 6 where a filter element 50 with a filter media 52 is shown, it is seen that the filter media is pleated horizontally as opposed to vertically as is the case in FIGS. 1–3. While a circular air filter element is illustrated, the filter element may also be oblong, oval or polygonal.

As seen in FIG. 4, it is preferable that the pleats are parabolic in cross section so that the filter media 52 has panels 54 which are substantially legs of a parabola with the panels 54 being joined by arcuate ends 56 and 58 that form peaks and valleys, regardless of the filter media. The peaks 56 and valleys 58 each include lines 60 and 62, respectively, where the slope in the filter media 22 changes direction. As is seen in FIGS. 5 and 6, the panels 54, peaks 56, the valleys 58 and the lines 60 and 62 are annular about the axis 66 of the filter element 50 and surround the hollow space 53 defined by the filter media 52.

By utilizing the parabolic arrangement of FIGS. 4–6 advantage is taken of a change in air flow management and pleat spacing which improves the filter's capacity, efficiency and decrease in resistance to air flow therethrough. The improvement in capacity, which is the amount of contaminant particles that the filter will hold before being plugged, is a result of lower initial restriction. This means that the starting pressure and ending pressure of the filter has a wider differential pressure gradient during testing. In a standard test the terminating pressure is a 25 inches of water pressure drop across the filter. When the initial pressure drop is much lower, the test will last longer due to the occurrence of the 25 inches of water terminating pressure when there is a constant rate of contaminant addition. Its capacity is improved by the add rate multiplied by the time of the test, as extended by the lower pressure drop. For example, three inches of water to 25 inches of water takes 22 minutes. If the add rate of the particulate is 1 gram per minute, the capacity is 22 grams. If the initial restriction was 0.5 inches of water, the test result could possibly be 0.25 inches of water to 25 inches of water which equals 24.5 minutes with the same add rate capacity, which would be 24.5 grams. The efficiency of the filter improves because the parabolic shape of the media 52 of FIGS. 4–6 allows for an increase in media area. This is because pleat spacing is improved by a continuous parabolic pattern. As is seen in FIG. 4, capacity is increased because bridging of the media between the panels 54 is reduced or eliminated allowing contaminants to reach the valley floors 58 of the pleated media 52.

The resulting increase in available media area improves the efficiency of the filter due to a decrease in face velocity, face velocity being the speed at which air passes over or through the surface of the filter media 52. For example, one square foot of media area exposed to 10 cubic feet of air flow per minute has a face velocity of 10 cubic feet per minute. If the media area is increased to two square feet, the face velocity is then 5 cubic feet per minute. A substantial decrease in face velocity slows the speed at which contaminating particles contained in the air strikes the media 52. This reduction in impact speed improves the media retention properties and reduces the chances of the particles passing completely through the media.

In accordance with the invention, media restriction reduction is due to the "ideal" amount of media to be used without bridging the media as shown in FIG. 3. In configuring the filter media 52, the count of the media pleats 54 having the lowest restriction and maximum area that does not result in bridging achieves a higher air flow rate and thus an increase in engine performance and horsepower.

The material from which the media 52 is made includes cellulose, phenolic cellulose, synthetic materials either mixed with non-synthetic materials or full synthetic materials as well as wire backed filter media such as wire backed, spun bonded polyester. The filter media 52 can be oiled or in other ways treated to increase its capacity and contaminate holding ability. As with the prior art arrangement of FIGS. 1–3, filter media 52 has a top end cap 70 and a bottom end cap 72 as well as an internal wire support 74 so that it can be readily used with existing filter housing arrangements.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An air filter comprising a filter media defining a hollow core, the filter media having first and second axially displaced ends and being pleated to define radially extending panels which meet along lines which define peaks and valleys, the radially extending panels and lines of the filter media extending circumferentially around the hollow core.

2. The air filter of claim 1 further including end caps overlying the first and second ends and surrounding the hollow core, the end caps being fixed to opposite end faces of the filter media and extending laterally with respect to the hollow core.

3. The air filter of claim 2 wherein the air filter is annular.

4. The air filter of claim 2 wherein the air filter is oval.

5. The air filter of claim 2 wherein the pleats are substantially parabolic in cross section with the lines being defined where the slope of the media changes direction.

6. The air filter of claim 5 wherein the air filter is circular.

7. The air filter of claim 5 wherein the air filter is oval.

8. A method of configuring a pleated filter media profile comprising arranging the media to define a hollow core with the media surrounding the hollow core; forming pleats in the media with the pleats having parabolic peaks and valleys joined by panels circumferentially around the hollow core with the peaks and valleys extending; spacing the pleat by a sufficient distance to avoid bridging of adjacent panels by particles whereby accumulation of particles builds from the valleys toward the peaks.

9. An air filter comprising a filter media defining a hollow core, the filter media being pleated to define panels which are substantially legs of parabolas, the panels having curved end portions which join curved end portions of adjacent panels to form arcuate ends, the arcuate ends forming peaks and valleys of the pleated media, the peaks and valleys extending circumferentially around the hollow core.

10. The air filter of claim 9 wherein the media is circular.

11. The air filter of claim 9 wherein the filter media is oval.

12. The air filter of claim 9 further including end caps surrounding the hollow core, the end caps being fixed to the first and second axially disposed ends of the filter media and extending radially with respect to the hollow core.

\* \* \* \* \*